US009246901B2

(12) United States Patent
Gasparini et al.

(10) Patent No.: US 9,246,901 B2
(45) Date of Patent: Jan. 26, 2016

(54) SECURE NETWORK COMPUTING

(71) Applicant: Personal Capital Technology Corporation, Redwood City, CA (US)

(72) Inventors: Louis A. Gasparini, San Mateo, CA (US); William H. Harris, Jr., Woodside, CA (US); Do-Pil (Don) Park, Rewood City, CA (US)

(73) Assignee: Personal Capital Technology Corporation, Redwood City, CA (US)

( * ) Notice: Subject to any disclaimer, the term of this patent is extended or adjusted under 35 U.S.C. 154(b) by 105 days.

(21) Appl. No.: 14/255,777

(22) Filed: Apr. 17, 2014

(65) Prior Publication Data
US 2014/0230013 A1    Aug. 14, 2014

Related U.S. Application Data

(63) Continuation of application No. 12/288,855, filed on Oct. 22, 2008, now Pat. No. 8,707,387.

(51) Int. Cl.
*H04L 29/06* (2006.01)
*H04L 9/32* (2006.01)

(52) U.S. Cl.
CPC .............. *H04L 63/08* (2013.01); *H04L 9/3213* (2013.01); *H04L 2209/56* (2013.01); *H04L 2209/76* (2013.01)

(58) Field of Classification Search
CPC . G06F 21/6218; H04L 63/0815; H04L 63/10; H04L 63/08
USPC ........................................................ 726/4, 7
See application file for complete search history.

(56) References Cited

U.S. PATENT DOCUMENTS

| | | | | |
|---|---|---|---|---|
| 5,708,780 A | * | 1/1998 | Levergood | G06F 21/41 709/203 |
| 7,047,560 B2 | * | 5/2006 | Fishman | G06F 21/31 380/270 |
| 7,552,467 B2 | * | 6/2009 | Lindsay | G06F 21/31 713/165 |
| 2005/0152305 A1 | * | 7/2005 | Ji | H04L 45/54 370/328 |
| 2007/0143824 A1 | * | 6/2007 | Shahbazi | H04L 63/083 726/1 |
| 2007/0234408 A1 | * | 10/2007 | Burch | G06F 21/31 726/6 |
| 2007/0234417 A1 | * | 10/2007 | Blakley, III | H04L 63/0281 726/12 |
| 2008/0235513 A1 | * | 9/2008 | Foster | G06F 21/33 713/185 |
| 2010/0037046 A1 | * | 2/2010 | Ferg | H04L 9/321 713/155 |

* cited by examiner

*Primary Examiner* — Dao Ho
(74) *Attorney, Agent, or Firm* — Cascio & Zervas; Anthony T. Cascio; Charles H. Jew

(57) ABSTRACT

A host based security system for a computer network includes in communication with the network a credential host that is operative in concert with a local computer and a destination site. The destination site has a credential authentication policy under which credentials associated with the local computer upon being authenticated authorizes data to be communicated between each of the destination site and the local computer during a communication session over the network. The credential host stores the credentials to be used by the destination and is operative to transmit the credentials onto the network in response to a request received from the local computer. The destination site upon the credentials being received and authenticated thereat is operative to transmit session information onto the network. The local computer is then operative to commence the communication session upon receipt of said the information.

38 Claims, 3 Drawing Sheets

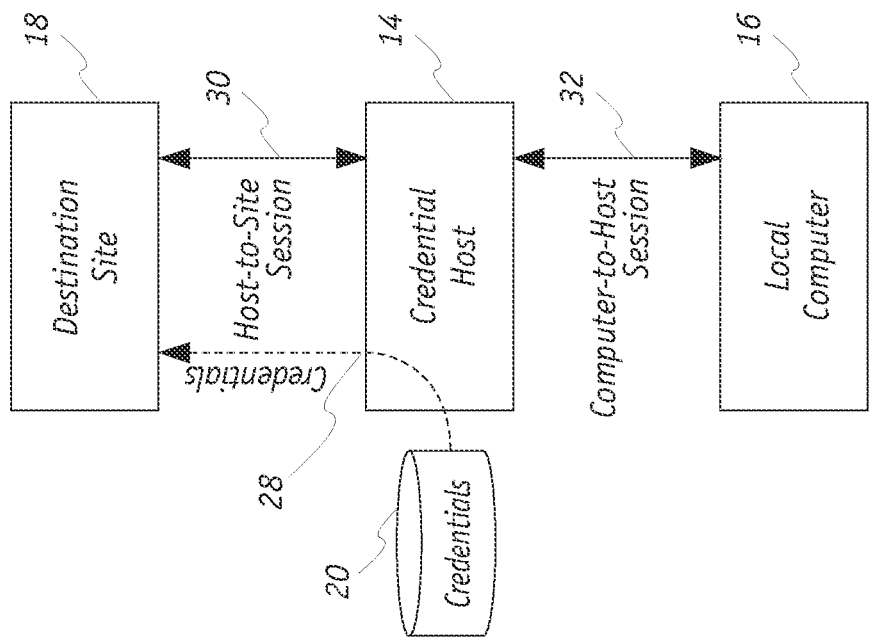
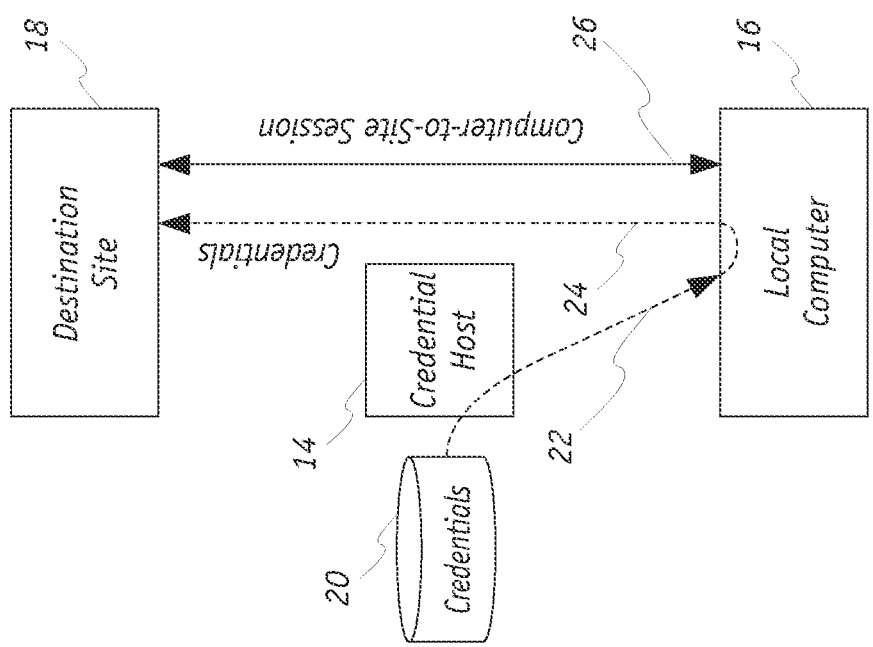

SECURE NETWORK COMPUTING

BACKGROUND OF THE INVENTION

1. Field of the Invention

The present invention relates generally to authentication and authorization in a network communications and more particularly to a host based security system in which credentials may be transmitted from a credential host, which store such credentials, to a destination site on a network server for the authentication of a local computer, which may otherwise be unsecured or compromised, upon request of the local computer to connect to the destination site.

2. Description of the Related Art

Since the release of the web browser client, network communication between computers has become a common daily occurrence for computer users worldwide. Evolving from the nascent days of email and simple web browsing, the Internet has become a public network platform upon which millions of recreational, consumer, business and commercial users daily entrust to bidirectional communication of, for example, their banking and financial data as well as its storage on a remote site. Moreover, this data is most oftentimes confidential, proprietary or personal, and its unauthorized disclosure or misappropriation has been known to result in financial loss to both individuals and enterprises.

Also from these nascent days of the Internet to the present there has existed numerous and varied threats to the security of transmission of this data. These threats manifest themselves as attacks on either the communications carrying such data or the hardware devices themselves that effect such communications. To address these threats, protocols have been developed to secure network communications and an entire network and Internet security industry has evolved to provide both hardware and software security solutions.

In a most basic example of network computing, a user at a local computer initiates, typically through a web browser interface executing on the local computer, a communication session with a destination site in which data is communicated bidirectionally between the local computer and the destination site. During this communication session user data stored at the destination site may be viewed in the web browser interface and information entered into the web browser interface to be communicated to the destination site to modify, add to or delete from the data stored thereat.

As is well known, this communication session is maintained over a connection established between the local computer and the server on which the destination site is stored. This connection is routed along a communication path that encompasses a network of nodes interconnected by a web of links using well known protocols. It is therefor seen that to secure the transmission of data along this communication path to prevent any unauthorized disclosure or misappropriation thereof, protection must be provided at each of the local computer, the server on which destination site is stored and at each node and link along the communication path.

Typically, each of the servers on which destination sites are stored and the links and nodes along the communication path are operated by enterprises for which providing robust security of the servers, links and nodes is a basic necessity. Accordingly, attacks to compromise the security of the communication path to effect the unauthorized disclosure or misappropriation of the data being communicated thereon are most often targeted to the local computer whereat such attacks are relatively easier to effect. These attacks usually are effected through the installation on the local computer of malware, which is malicious computer software that interferes with normal computer functions of the local computer or that sends personal user data stored on the local computer or entered into the web browser interface to unauthorized parties over the network.

The local computer becomes the frequent target of attacks because many of the local computers connected to the Internet are owned or operated by users many of whom, whether through negligence, recklessness, inattentiveness or lack of appreciation of Internet threats, forgo the installation of widely available security software thereby leaving their own local computer vulnerable to such attacks. Other users of the local computers may install such security software but may be mistaken in their belief that their own local computer is properly secured by such software. For example, many users who do install security software may through negligence or lack of technical expertise fail to properly configure such software upon its initial installation or obtain available updates as such become available to protect against the latest discovered threats.

Even a user of high technical expertise may be unaware of the presence of malware despite the presence of properly configured and updated security software. Sophisticated malware has been known to be specifically written to avoid detection from most common consumer security software. The local computer may be compromised although the user believes otherwise from an apparent lack of warning or other indication from installed security software that is relied upon to monitor and assess security risks.

Malware can be surreptitiously installed on the local computer typically from downloading and opening content from compromised or malicious destination sites or inadvertently from opening an attachment in an email. Malware can also be installed on the local computer from the network should a scan from a remote site reveal an open port to the local computer through which a direct connection thereto can be made.

Other local computers may also be those as provided for use to the general public, such as those provided by public libraries or hotels. Not only may these public local computers have their security compromised as set forth above, but more insidiously by a malicious user who can readily install malware directly on any such public local computer as the use of these computers is generally unsupervised.

Of primary concern herein is malware that sends personal and confidential data about the user from the user's local computer to unauthorized parties over the network. One example of this type of malware captures user credentials, such as through keystroke loggers, as they are being entered into the web browser interface when such credentials are needed to be transmitted to a destination site for authentication thereat prior to access of the user data stored at such site. Once a user's credentials have been obtained through malware, the destination site can be accessed by such unauthorized users from any other computer wherever located to obtain and misappropriate such confidential and private user data.

Similarly, such malware can also capture other sensitive data of the user being entered at the local computer subsequent to the credentials being authenticated. For example, financial information, such as relating to credit card numbers or account numbers for banks and other financial institutions, may also be logged as entered in the web browser interface. As stated above, misappropriation of any of this data can result financial loss to the user whose credentials have been misappropriated.

Accordingly, a need exists to provide a system or method which enables user credentials to be sent to a destination site to authenticate a local computer while minimizing the possibility of such credentials being surreptitiously captured at the local computer and transmitted to unauthorized users. Yet another need exists to provide a system or method which enables user private information to be sent a destination site to effect commerce thereat while also minimizing the possibility of such user private information being surreptitiously captured at the local computer and transmitted to unauthorized users. This need is met by the inventions disclosed and claimed below.

SUMMARY OF THE INVENTION

It is accordingly an object of the present invention to provide a method and apparatus in which user credentials are sent to a destination site to authenticate a local computer while minimizing the possibility of such credentials being surreptitiously captured at the local computer and transmitted to unauthorized users.

It is a further object of the present invention to provide a method and apparatus in which user private information is sent a destination site to effect commerce thereat while also minimizing the possibility of such user private information being surreptitiously captured at the local computer and transmitted to unauthorized users.

In accordance with one embodiment of the present invention, a host based security system for a computer network includes in communication with such network a credential host that is operative in concert with a local computer and a destination site. The destination site has a credential authentication policy under which credentials associated with the local computer upon being authenticated authorizes data to be communicated between each of the destination site and the local computer during a communication session over the network. The credential host stores the credentials to be used by the destination and is operative to transmit the credentials onto the network in response to a request received from the local computer. The destination site upon the credentials being received and authenticated thereat is operative to transmit session information onto the network. In turn, the local computer is then operative to commence the communication session upon receipt of said the information.

In accordance with another embodiment of the present invention, a host based security method for a computer network including the step of transmitting credentials into the network from a credential host at which the credentials are stored in response to a request received from a local computer in communication with said network. Such method includes the next step of receiving the credentials at a destination site in communication with the network. The destination site has a credential authentication policy under which credentials associated with the local computer upon being authenticated authorizes data to be communicated between each of the destination site and the local computer during a communication session over the network. Finally, such method includes the step of transmitting session information onto the network from the destination site upon the credentials being received and authenticated thereat. The local computer is operative to commence the communication session upon receipt of the session information.

A feature of the present invention is that by storing the credentials at the credential host and transmitting them therefrom, the primary object of the present invention is met by providing enhanced safeguarding and security from misappropriation of credentials, which typically occurs at the local computer, when such credentials are needed to be used by the destination site for authentication of the local computer. Thus, a user can access the destination site from any local computer wherever located, no matter how unsecured such computer is. Irrespective of the local computer being the user's own computer or a public computer, upon the user needing credentials to be sent to the destination site, such credentials are advantageously sent from a secure credential host and not subject to misappropriation at the local computer.

The principles of the present invention, in further embodiments of the present invention may also be applied to any information that is typically required to be entered at the local computer for transmission to the destination site. In such cases, such information may also be stored at the credential hosts, and when such information is needed to be entered at the local computer, alias information, exemplarily such as a predetermined alphanumeric character string, may instead be sent and intercepted by the credential host, which then substitutes the correct information for the alias information for transmission on to the destination site. Accordingly, the present invention mitigates against misappropriation and misuse of user information by advantageously minimizing the need for such information to ever be stored at, or be transmitted from, the local computer, even if such local computer is attacked or otherwise compromised by malware.

These and other objects, advantages and features of the present invention will become readily apparent to those skilled in the art from a study of the following Description of the Exemplary Preferred Embodiments when read in conjunction with the attached Drawings and appended Claims.

BRIEF DESCRIPTION OF THE DRAWING

FIG. 2A is a schematic block diagram showing redirection of the credentials from the credential host through the local computer to the destination site;

FIG. 2B is a schematic block diagram showing replication of a communication session between the credential host and destination site to a communication session between the credential host and the local computer;

DESCRIPTION OF THE EXEMPLARY PREFERRED EMBODIMENTS

Figure 1:
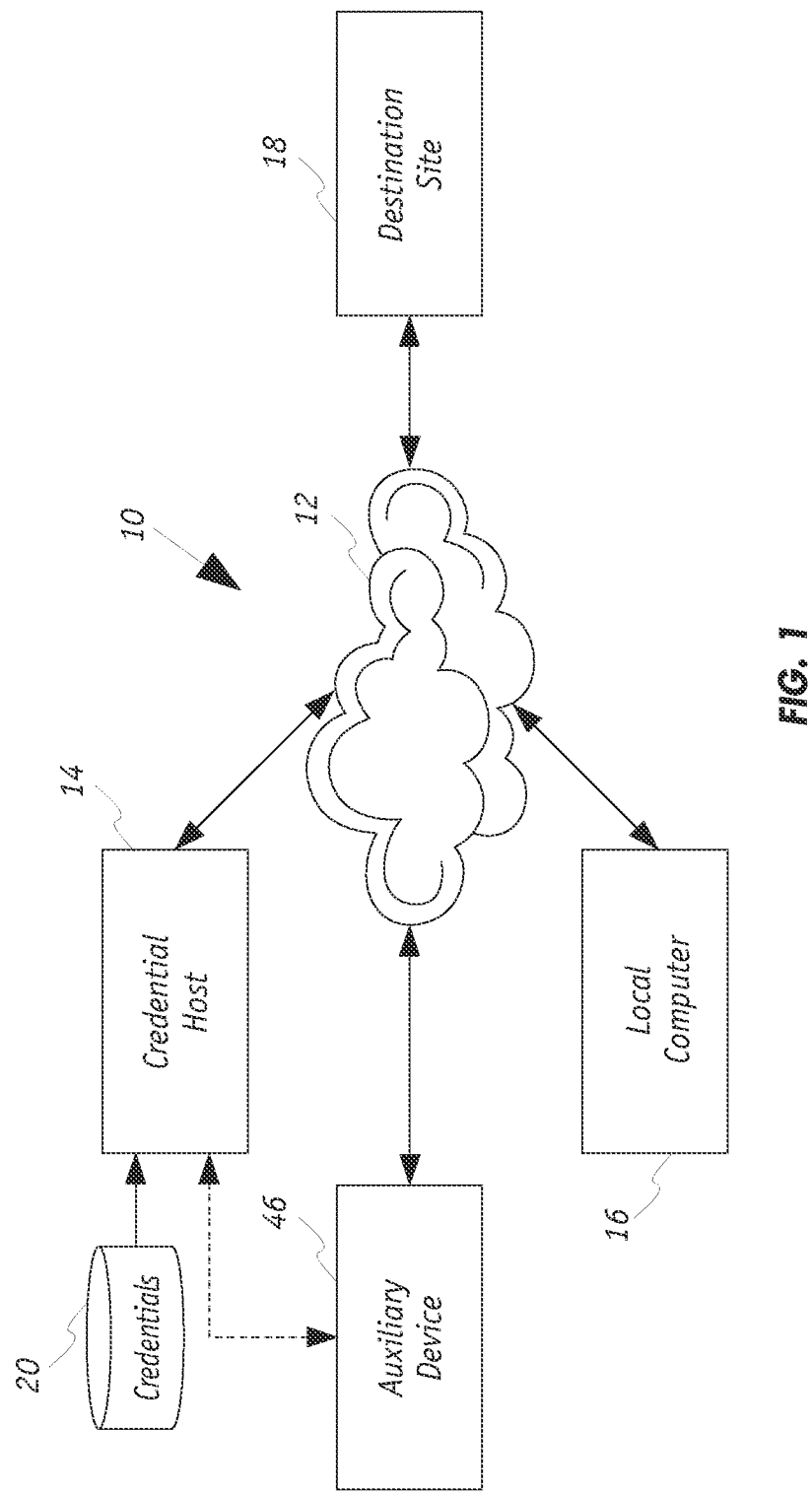
FIG. 1 is a schematic block diagram of a host based security system constructed according to the principles of the present invention.

Referring now to FIG. 1, there is shown a host based security system 10 for a computer network 12. The host based security system 10 includes a credential host 14 that, in concert with a local computer 16 and a destination site, provides enhanced safeguarding and security from misappropriation of credentials associated with the local computer 16 when such credentials are needed to be used by the destination site 18 for authentication of the local computer 16. Each of the credential host 14, local computer 16 and the destination site 18 are in communication with the network 12 and therefore in communication with each other.

As is known, the destination site 18 may have a credential authorization policy under which credentials, which are associated with the local computer 16, upon being authenticated authorizes data to be communicated between each of the destination site 18 and the local computer 16 during a communication session over the network 12. Credentials associated with the local computer 16 include without limitation any credentials that are personal to a user of the local computer 16 as well any credentials specific to the local computer 16.

In accordance with the present invention, the credentials associated with the local computer 16 are stored at the credential host 14, exemplarily as best seen in FIG. 1, on a computer readable medium 20. It is to be understood that additional local computers similar to local computer 16 may be in communication with the network 12 and that the credential associated with each of the additional local computers or the users of such additional computers may also be stored and indexed at the credential host 14 in a known relational database. Credentials, which are personal to a user, allow a user to use any available local computer in communication with the network 12, and thus such credentials become associated with the local computer being used.

In the broadest aspect of the present invention, the credential host 14 is operative to transmit the credentials associated with the local computer 16 onto the network in response to a request received over the network 12 from the local computer 16. The destination site 18 upon the credentials being received and authenticated thereat is operative to transmit session information onto the network 12. The local computer 16 is operative to commence the communication session upon receipt of the session information.

The host based security system 10 as described above can be implemented in several different embodiments. Exemplarily, such embodiments include redirection of the credentials from the credential host 14 through the local computer 16 then to the destination site 18; replication of a communication session between the credential host 14 and destination site 18 to a communication session between the credential host 14 and the local computer 16; transfer of a communication session initiated between the credential host 14 and the destination site 18 to a communication session between the local computer 16 and the destination site 18; and a shared session in which a communication session between the credential host 14 and the destination site 16 is mirrored between the credential host 14 and the local computer 16. For enhanced security, any of the above sessions may be an SSL session.

Referring now to FIG. 2A, there is shown a redirection of the credentials from the credential host 14 through the local computer 16 and then to the destination site 18. The credential host 14 transmits the credentials onto the network, as described above, and the credentials received at the local computer 16, as indicated at 22. The credentials are retransmitted, using known redirect techniques, from the local computer 16 over the network 12 to the destination site 18, as indicated at 24. Upon receipt and authentication of the credentials at the destination site 18, the session information developed thereat is transmitted and received at the local computer 16 and the communication session is thereby established between the local computer 16 and destination site 18, as indicated at 26.

The session information, as in known, includes inter alia at least one session cookie issued by the destination site 18 and placed at the local computer 16. The session cookie is indicative that the credentials associated with the local computer 16 have been authenticated.

Although the credentials are redirected through the local computer 16, the credentials are not stored nor entered at the local computer 16, thereby substantially eliminating risk of misappropriation from malware at the local computer 16. Furthermore, since the credentials are preferably transmitted over a SSL session, the possibility that such credentials can be read at another location in the network 12 is also substantially minimized.

Referring now to FIG. 2B, there is shown a replication of a communication session between the credential host 14 and destination site 18 to a communication session between the credential host 14 and the local computer 16. The credential host 14 transmits the credentials onto the network, as described above, and the credentials are then received at the destination site, as indicated at 28. Upon receipt and authentication of the credentials at the destination site 18, the session information developed thereat is transmitted and received at the credential host 14, and the communication session is thereby established between the credential host 14 and the destination site 18, as indicated at 30.

Next, a further communication session, as indicated at 32, is established over the network 12 between the credential host 14 and the local computer 16. Using known techniques, the data communicated in the communication session between the credential host 14 and the destination site 18 is replicated and transmitted in the further communication session between the local computer 16 and the credential host 14.

In the embodiment of FIG. 2B, the session information also includes an address of a location at the destination site 18 in addition to the session cookie. The data transmitted in the communication session between the credential host 14 and the destination site 18 associated with this address. This address is translated at the credential host such that the data replicated in the further communication session between the credential host 14 and the local computer 16 is associated with the translated address.

In one aspect of the embodiment of the present invention, the credential host 14 may store the session information for the communication between the credential host and the destination site. The credential host 14 then develops new session information for a second communication session between the credential host 16 and the local computer 16.

Furthermore, the credential host 14 may be operative to inspect data transmitted in the communication session and implement predetermined rules in the event predetermined information at the destination site 18 is selected prior to the predetermined information being acted upon at the destination site 18. Such predetermined information may include a preselected web page at the destination site 18 or a preselected hyperlink in a web page at the destination site 18.

In addition thereto, the host-based security system 10 may further comprise an auxiliary device 46 associated with a user of the local computer 16 and adapted for communication with the credential host 14. One or more of the predetermined rules may require additional credentials associated with the user to be entered at the auxiliary device 46 and transmitted to the credential host 14 upon selection of the predetermined information. The predetermined information is then acted upon only in the event the additional credentials are authenticated at the credential host 14.

The credential host 14 may also store personal information of the user of the local computer 16 in association with an alphanumeric character string, which is enterable by the user at the local computer 16 and transmittable to the credential host 14 using known techniques. In response to receipt of the character string, the credential host 14 is operative to transmit the personal information associated with the character string to the destination site 18.

Figure 2D:
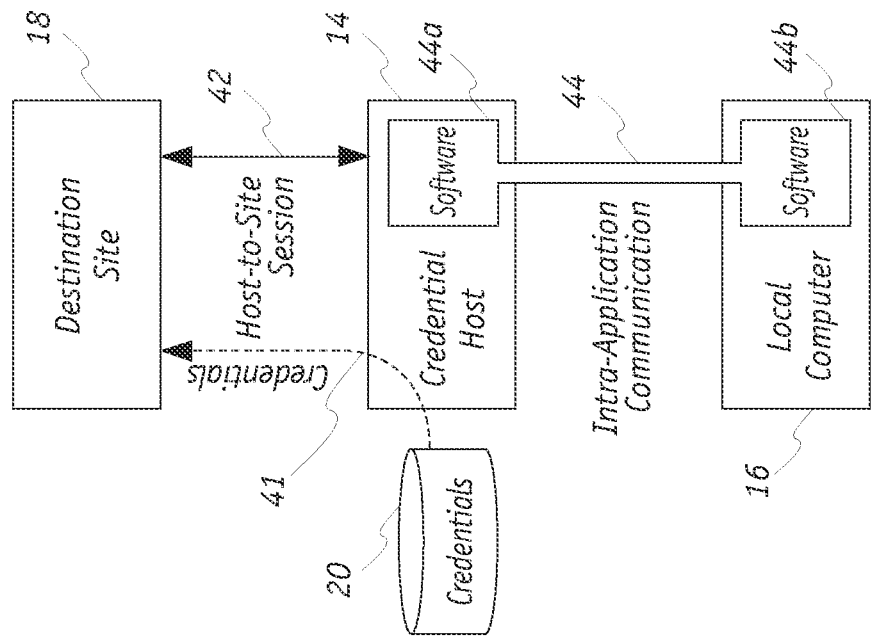
FIG. 2D is a schematic block diagram showing a shared session in which a communication session between the credential host and the destination site is mirrored between the credential host and the local computer.
Figure 2C:
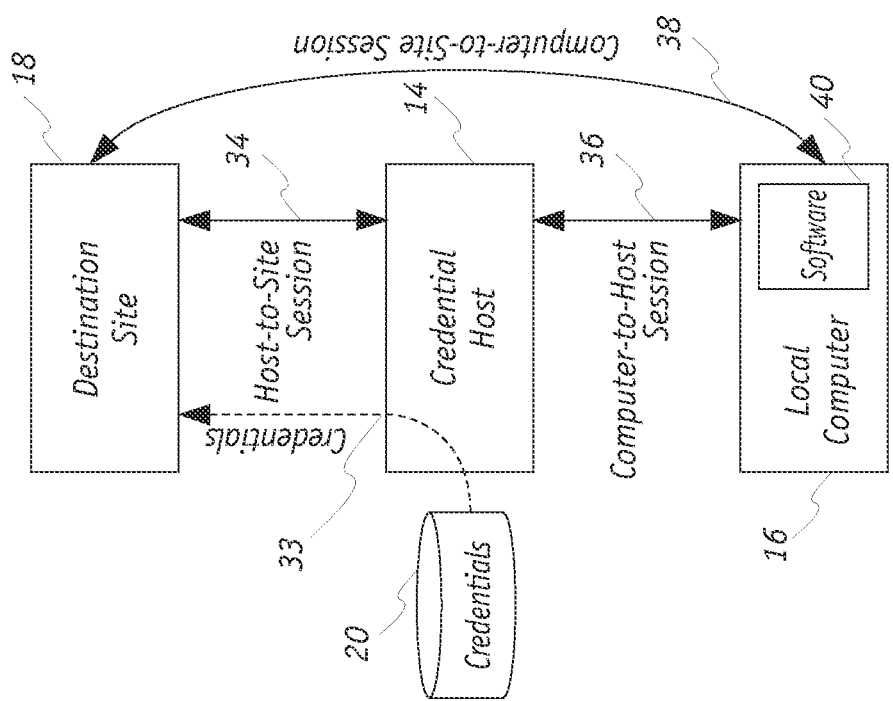
FIG. 2C is a schematic block diagram showing transfer of a communication session initiated between the credential host and the destination site to a communication session between the local computer and the destination site.

Referring now to FIG. 2C, there is shown a transfer of a communication session initiated between the credential host 14 and the destination site 18 to a communication session between the local computer 16 and the destination site 18. The credential host 14 transmits the credentials onto the network, as described above, and the credentials are then received at the destination site 18 as indicated at 33. Upon receipt and authentication of the credentials at the destination site 18, the session information developed thereat is transmitted and received at the credential host 14 over the host-to-site session, as indicated at 34. The credential host 14 next transmits the session information to the local computer 16 over a computer-to-host session, as indicated at 36, and the communication session is thereby established between the local computer 16 and the destination site 18, as indicated at 38.

The session information, similarly as described above, includes at least one session cookie issued by the destination site 18 upon authentication of the credentials thereat and an address of an entry location at the destination site 18. The request, described above with reference to FIG. 1, in the present embodiment of FIG. 2C, is a request to connect to the destination site that is first transmitted over the computer-to-host session 36 and then transmitted over the host-to-site session 34 from the credential host 14.

The embodiment of FIG. 2C advantageously reduces bandwidth requirements imposed upon the credential host 14 in comparison to the session replication embodiment of FIG. 2B. Furthermore, session replication may cause some functions implemented in web pages at the destination site 18 to fail to render properly and execute at the local computer 16. This failure mode is obviated by the embodiment of FIG. 2C.

In the embodiment of FIG. 2C, there may be a software module 40 installed on the local computer 16. The software module 40 may typically be any of a browser plug-in, a stand-alone application or custom browser. As described in greater detail below, the features of the software module 40 may be implemented by preference settings within existing browsers, attached proxy, secure browser or secure on-line application.

The software module 40 watches for attempts to access the destination site 18, such as through a URL for the destination site 18 being resolved. The software module 40 then transfers such attempts to the credential host 14, which in turn connects to the destination site 16 to initiate the credential authentication as described above. The functions performed by the software module 40 thus exemplarily include URL vetting, proxy, DNS setting and authentication functions, the implementation of such functions are well known and need not be further described herein.

One particular implementation of the software module 40 functions to point the DNS settings of the local computer 16 to the DNS settings of the credential host 14. Accordingly, the credential host 14 resolves domains of the destination site 18 and routes the communication session through the credential host 14. By pointing the DNS settings as described, the credential host 14 need not rewrite URL's but may however need to inject root certificates into the browser of the local computer 16.

Another particular implementation of the software module 40 is implemented as a proxy controlled by the credential server 14. In this implementation, the software module 40 obtains instructions from the credential host 14, in advance or in-line, whether to rewrite each URL to a URL controlled by the credential host 14. Because the software module 40 can rewrite the host controlled URL back to the original URL before returning a response to the browser on the local computer 16, the root certificate of the credential host 14 is not necessary in the browser. The communication session, when transferred from the host-to-site session 34 to the communication session 38 includes the session ID and cookies transferred to the local computer 16.

In an environment on the local computer 16 in which other proxies are present, the software module 40 is preferably an attached proxy to the browser of the local computer 16, such that it intercepts all traffic emanating from the browser prior to being directed to any other pre-existing proxy. Otherwise traffic control can be embedded in the browser by plug-in or other known modification to implement the software module 40.

Alternatively, the software module 40 may be a secure browser on the local computer 16 in which the credential host 14 is allowed to control traffic flow. In addition thereto, the software module 40 may be a secure online application that supports interactivity with the credential host 14 and the destination site 18, including traffic control and other know security measures.

Referring now to FIG. 2D, there is shown a shared session in which a communication session between the credential host 14 and the destination site 16 is mirrored between the credential host 14 and the local computer 16. The credentials are received at the destination site 18, as indicated at 41, and the session information is received at the credential host 14 such that the communication session, as indicated at 42, is established over the network 12 between the credential host 14 and the destination site 18.

Without any further session being initiated, the credential host 14 extends, or otherwise shares, access to the communication session 42 to the local computer 16. The local computer 16 may then interact with the data communicated over the communication session 42. In one embodiment, the credential host 16 includes a browser in which data transmitted in the communication session is rendered. This rendered data may then be mirrored at the local computer 16. Session information is similar as described above.

There are several advantages to the shared session embodiment of FIG. 2D. One such advantage is that only one communication session is required. Furthermore, under certain circumstances when transferred or proxy sessions are used, some web pages may fail to render properly at the local computer 16. The shared session embodiment of FIG. 2D obviates this failure mode. Another distinct advantage of the shared session embodiment is that, since there is no active communication session between the local computer and either of the credential host 14 or the destination site 18, protection against any malware that may have been surreptitiously installed at the local computer 16 is enhanced.

One implementation of the shared embodiment of FIG. 2d, the credential host 14 and the local computer 16 may each include executable components 44a, 44b of a distributed network or split browser 44. The split browser 44 thus executes partially on the credential host 14 and partially the local computer 16.

In the split browser embodiment, components of the split browser residing at the local computer 16 manage display and input and components of the split browser residing at the credential host 14 manage authentication. The communication session between the credential host 14 and the destination site 18 may also be an SSL session. Moreover, the interfaces of the components are communicated between the local computer 16 and the credential host 14 through an application level tunnel.

In any of the above described embodiments of the host based security system 10 as set forth above, the credential host 14 may be further operative to transmit to the destination site 18 additional information associated with the credentials. The additional information is associated with a user of the local computer 16 such that the credentials received at the destination site are validated as being associated with the user. This advantageously provides yet another layer of protection when attacks are made at other than the local computer 16.

In order to provide the additional information, the host based security system 10 may further include the auxiliary device 46, described above, associated with the user which is in communication with the credential host 14. The additional information may then be developed at the credential host 14 in response to the auxiliary device 46 being authenticated by the credential host.

For example, the additional information may be a token. For additional security, the token may encrypted using a key known only to the credential host 16 and the destination site 18 and may also expire upon expiration of a selected time duration.

In an initial setup of the host based security system 10, the credentials include a User ID and an initial password associated with the user of the local computer 16 and as such user may have originally registered such credentials with the destination site 18. To further security of these credentials, the credential server 14 upon the credentials being stored at thereat may register a subsequent password at the destination site 18 to replace the initial password. In such event, even if the local computer 16 had been compromised by malware and the User ID and initial password misappropriated, such initial password would now be invalid for authentication at the destination site 18, and the new password would not have ever been stored at or passed through the local computer thereby shielding it from misappropriation.

The credential server 14 may also store private user information associated with the credentials that is made available to the destination site 18 during the communication session. Exemplary private information may be any of account numbers of financial institution and credit cards, or any other type of information personal to the user of the local computer 16 that is required to access information or conduct transactions at the destination site 18, the misappropriation of which would cause harm or loss to such user.

Yet another level of security may be added to the host based security system 10 in which the local computer 16 is authenticated by the credential host 14 prior to the request for connection to the destination site 16 being received from the local computer 16. For example, the local computer 16 may be authenticated by auxiliary credentials received from the auxiliary device 46 associated with a user of the local computer wherein the auxiliary device 46 is in communication solely with the credential host 14.

For example, the user may enter such auxiliary credentials into the axillary device 46 prior to causing the local computer 16 to send the request to connect to the destination site 16. In such embodiment, the user is secure even if the local computer 16 is a public computer as may be found in a public library or hotel lobby.

The auxiliary device 46 from which the auxiliary credentials are received may further be selected in accordance with rules established by the user in accordance with the local computer 16 currently operated by the user. For example, if the local computer 16 is one such public computer, the rules may specify that the auxiliary device 46 be a cell phone or other such wireless personal digital assistant carried by the user.

Another layer of security may be added to the host based security system 10 to warn of credentials being sent to the destination site 18 that the user of the local computer 16 may not otherwise know of More specifically, the credential host 14 upon transmission of the credentials to the destination site 18 transmits predefined information to the auxiliary device 46 associated with the user who owns such credentials. Should the user's master account with the credential host somehow be compromised and a request is sent form any computer not under control of the user, the user will be notified of the attempt. Otherwise, even if such attempt is authorized, the user has knowledge of the access.

The auxiliary device 46 may exemplary be any cell phone, personal digital assistant or even another local computer. The type of auxiliary device may further be selected in accordance with which destination site 18 is requested. Furthermore, the predefined information may be established to be sent only when a selected destination site 18 is requested.

As described above, the user establishes a master account with the credential host 14 such that the credential host 14 stores the user's credentials for each destination site 18 that the user has determined. The user prior to requesting any destination site 18 first logs into the credential host 14, such that when credentials are requested by the destination site 18, the credential host 14 intercepts and sends the credentials to the destination site 18 instead of the user at the local computer 16 entering such credentials and transmitting them therefrom.

When the user is at a local computer that is otherwise not secure, such as a public computer in a hotel or library, or is using a secure computer such as the user's own laptop but in an otherwise unsecured area such as a public WiFi hot spot, a risk of misappropriation of the user ID and password that the user needs to log into the credential host 14 arises. In this event, the auxiliary device 46 may also be used to enter this user ID and password, or just the password with the user ID entered at the local computer 16.

In a further embodiment of the present invention, the credential host 14 has its own credential authentication policy under which credentials associated with the user of the local computer 16 upon being authenticated authorizes the credential host 14 to be responsive to the request received from the local computer 16 to connect with the destination site 18. The auxiliary device 46, associated with the user is in communication with the credential host 14 from which the user credentials, password, or user ID and password, may be sent.

When only the password is to be sent from the auxiliary device 46, the credential host 14 signals the auxiliary device 46 upon receipt of the user ID from the local computer 16. The user reacts to this signal and enters the password at the auxiliary device 46 and causes it to be set to the credential host 14. Accordingly, the auxiliary device 46 may be cell phone or personal digital assistant and the password may be a numeric personal identification number.

Similarly, after a communication session between the local computer 16 and the destination site 18 has been established as in any of the above described embodiments of the host based security system 10, the auxiliary device 46 associated with the user of the local computer 16 and in communication with the credential host 14 may also be used to send to the destination site 18 form field information for which misappropriation from an otherwise compromised local computer 16 would entail serious risk for the user. When the data to be communicated between the local computer 16 and the destination site 18 includes such form fields, the credential host 14 may intercept and route the form fields to the auxiliary device 46. The user then enters information into the form fields at the auxiliary device 46 for transmission to the destination site 18.

Various rules may be established for which form fields are to be so routed. Certain form fields may be pre-identified as always to be routed to the auxiliary device 46, especially in the event the information to be entered into the form fields is associated with personal financial information of the user.

When the local computer 16 is operated by one of a plurality of authorized users, all of whom have a master account with the credential host 14, the credentials associated with the local computer 16 are accordingly unique for each of the users. The credentials for each of these users are stored at the credential host 14 in association with the destination sites 18 at which the credentials are to be authenticated, and stored also in association each of the users.

In this event, it is possible to also select the data that is to be communicated between the local computer 16 and the destination site 18 in accordance with the credentials for each one of the users. For example, members of a household may each have their own credentials for the same destination site 18. Access to certain areas of the destination site 18 may be controlled by rules established at the credential host 14, as all data to be communicated in the communication session between the local computer 16 and the destination site 18 goes through the credential host 14. For example, family account information on a banking or commerce site may be limited to read only for some of the users whereas other users may conduct transactions at such site.

In some embodiments of the host based security system 10, the destination site 18 may be nonsupportive of receipt of the credentials from the credential host 14 but instead the destination site 18 sends a form field into which such credentials are to be entered such that the destination site transmits to the local computer a form field into which the credentials are to be entered, the credential host storing an alphanumeric character string in association with the credentials, the string being entered into the form field and transmitted from the local computer, the credential host substituting the string for the credentials to transmit to the destination site.

Similarly as described above, the credential host may also store personal information of the user of the local computer 16 in association with an alphanumeric character string. When the destination site 18 transmits to the local computer 16 a further form field into which the personal information is normally entered, the further character string is entered by the user at the local computer 16 into this further form field and transmitted to the credential host 14. The credential host 14 then transmits the personal information associated with the character string in the further form field to the destination site 18 in response to receipt of the character string.

To enable the user of the local computer 16 to monitor security, the credential host 14 may maintain a transaction history, which may also be user configurable. For example, the transaction history may include an identification of any local computer 16 in which any communication session has been established with any destination site 18. Such identification is readily determined by a cookie stored at the local computer 16. Furthermore, the transaction history may include an identification of information accessed at the destination site.

In the embodiments above described, the credential host may further send information personal to the user of the local computer 16 to the destination site 18. To secure such information it may expire upon expiration of a selected time duration. For example, such information may be an identification of a financial instrument. Added security may be added by encrypting such personal information using a key known only to the credential host 14 and the destination site 18.

There have been described herein above novel apparatuses and methods for a host based security system for a computer network. Those skilled in the art may now make numerous uses of and departures from the herein above described embodiments without departing from the inventive principles disclosed herein. Accordingly, the present invention is to be defined solely by the lawfully permissible scope of the appended Claims.

What is claimed as the invention is:

1. A host based security system for a computer network having a local computer and a destination site in communication therewith to eliminate substantially detection at the local computer of the input of user credentials which uniquely identify a user of the local computer wherein the destination site has associated therewith a credential authentication policy under which the user credentials when received at the destination site are authenticated with respect to registered credentials stored in association with the destination site, the system comprising:

a credential host being in communication with the network and having the user credentials of the user of the local computer stored thereat, wherein the credential host intercepts a request transmitted onto the network by the local computer to connect securely to the destination site and further wherein the credential host in response to intercepting the request transmits the user credentials onto the network; and an auxiliary device associated with the user of the local computer, the credential host having a credential authentication policy under which the user credentials upon being authenticated at the credential host authorizes the credential host to be responsive to the request received from the local computer, the auxiliary device being in communication with the credential host, the user credentials being entered at the auxiliary device and transmitted to the credential host;

wherein the destination site upon receipt of the user credentials executes the credential authentication policy with the received user credentials and further wherein in the event the received user credentials are authenticated the destination site transmits secure session information onto the network;

wherein the local computer upon receipt of the session information establishes a secure communication session with the destination site;

wherein the session information is received from the network at the credential host and retransmitted therefrom to the local computer such that upon receipt of the session information at the local computer the communication session is established between the local computer and the destination site;

wherein a computer-to-host communication session exists between the local computer and the credential host and a host-to-site communication session exists between the credential host and the destination site;

wherein the request is transmitted from the local computer over the computer-to-host communication session and retransmitted from the credential host over the host-to-site communication session; and wherein the local computer includes a proxy controlled by the credential host such that data communicated between the local computer and the destination during the communication session is routed through the credential host.

2. A host based security system as set forth in claim 1 wherein the user credentials are first received from the network at the local computer and retransmitted by the local computer to the destination site and the session information is received from the network at the local computer such that the communication session is established between the local computer and the destination site.

3. A host based security system as set forth in claim 1 wherein the session information is received from the network at the credential host such that the communication session is established between the credential host and the destination site and further wherein a further secure communication session is established by the credential host between the credential host and the local computer in which data transmitted in the communication session between the destination site and the credential host is replicated in the further communication session between the credential host and the local computer.

4. A host based security system as set forth in claim 3 wherein the session information includes an address of the destination site, wherein the data transmitted between the credential host and the destination site is associated with the address and further wherein the address is translated at the credential host in which the replicated data transmitted between the credential host and the destination site is associated with the translated address.

5. A host based security system as set forth in claim 3 wherein the credential host stores the session information for the communication session between the credential host and the destination site, and further wherein the credential host develops new session information for a second communication session between the credential host and the local computer.

6. A host based security system as set forth in claim 5 wherein the credential host inspects data transmitted in the second communication session and further operative to implement predetermined rules in the event predetermined information at the destination site is selected prior to the predetermined information being acted upon at the destination site.

7. A host-based security system as set forth in claim 6 further comprising an auxiliary device associated with the user of the local computer wherein the auxiliary device is adapted for communication with the credential host and further wherein one of the predetermined rules requires additional credentials associated with the user to be entered at the auxiliary device and transmitted to the credential host upon selection of the predetermined information, the predetermined information being acted upon only in the event the additional credentials are authenticated at the credential host.

8. A host based security system as set forth in claim 3 wherein the credential host stores additional personal information of the user of the local computer in association with an alphanumeric character string, the character string being enterable by the user at the local computer and transmittable to the credential host, the credential host being operative to transmit the personal information associated with the character string to the destination site in response to receipt of the character string.

9. A host based security system as set forth in claim 1 wherein DNS settings of the local computer are pointed to DNS settings of the credential host such that the credential host resolves domains of the destination site and corresponding IP addresses of the destination site and routes the communication session with the domains through the credential host.

10. A host based security system as set forth in claim 1 wherein the session information is received from the network at the credential host such that the communication session is established between the credential host and the destination site and further wherein the credential host extends access to the communication session to the local computer such that the local computer interacts with the data communicated during the communication session.

11. A host based security system as set forth in claim 10 wherein the local computer and the credential host each include executable components of a distributed network browser wherein components at the local computer manage display and input and components at the credential host manage authentication.

12. A host based security system as set forth in claim 11 wherein interfaces of the components are communicated between the local computer and the credential host through an application level tunnel.

13. A host based security system as set forth in claim 10 wherein the credential host includes a browser in which data transmitted in the communication session is rendered, the rendered data being mirrored at the local computer.

14. A host based security system as set forth in claim 1 wherein the credential host is operative to transmit to the destination site additional information associated with the user credentials, the additional information being associated with the user of the local computer such that the credentials are validated as being associated with the user.

15. A host based security system as set forth in claim 14 wherein the host based security system further includes an auxiliary device associated with the user and in communication with the credential host, the additional information being developed at the credential host in response to the auxiliary device being authenticated by the credential host.

16. A host based security system as set forth in claim 14 wherein the additional information is encrypted using a key known only to the credential host and the destination site.

17. A host based security system as set forth in claim 1 wherein the user credentials include a User ID and an initial password associated with the user of the local computer and originally registered with the destination site, the credential host upon the user credentials being stored at thereat registering a subsequent password at the destination site to replace the initial password.

18. A host based security system as set forth in claim 17 wherein the credential host further stores private user information associated with the credentials, the private user information being available to the destination site during the communication session.

19. A host based security system as set forth in claim 1 wherein the user credentials include a user ID and a password, the user ID being entered at the local computer and transmitted to the credential host, the password being entered at the auxiliary device and transmitted to the credential host.

20. A host based security method for a computer network having a local computer and a destination site in communication therewith to eliminate substantially detection at the local computer of the input of user credentials which uniquely identify a user of the local computer wherein the destination site has associated therewith a credential authentication policy under which the user credentials when received at the destination site are authenticated with respect to registered credentials stored in association with the destination site, the method comprising steps of:

storing at a credential host the user credentials of the user of the local computer, the credential host being communication with the network;

intercepting at the credential host a request transmitted onto the network by the local computer to connect securely to the destination site;

transmitting the user credentials onto the network from the credential host in response to intercepting the request;

executing at the destination site upon receipt of the user credentials the credential authentication policy with the received user credentials;

transmitting onto the network from the destination site in the event the received user credentials are authenticated secure session information;

establishing a secure communication session at the local computer upon receipt of the session information; and entering at an auxiliary device user credentials associated with a user of the local computer and transmitting by the auxiliary device the user credentials to the credential host, the credential host having a credential authentication policy under which credentials associated with a user of the local computer upon being authenticated authorizes the credential host to be responsive to the request received from the local computer, the auxiliary device being in communication with the credential host;

wherein the credentials transmitting step transmits the credentials to the destination site and the session information transmitting step includes the steps of transmitting the session information from the destination site to the credential host and retransmitting the session information from the credential host to the local computer such that upon receipt of the session information at the local computer the communication session is established between the local computer and the destination site;

wherein a computer-to-host communication session exists between the local computer and the credential host and a host-to-site communication session exists between the credential host and the destination site, and further wherein the request is a request to connect to the destination site transmitted from the local computer over the computer-to-host communication session and retransmitted from the credential host over the host-to-site communication session; and wherein the local computer includes a proxy controlled by the credential host such that data communicated between the local computer and the destination site during the communication session is routed through the credential host.

21. A host based security method as set forth in claim 20 wherein the user credentials transmitting step includes the steps of first transmitting the user credentials from the credential host to the local computer and retransmitting the credentials from the local computer to the destination site and wherein the session information transmitting step transmits the credentials from the destination site to the local computer such that the communication session is established between the local computer and the destination site.

22. A host based security method as set forth in claim 20 wherein the credentials transmitting step transmits the credentials to the destination site and wherein the session information transmitting step transmits the session information to the credential host such that the communication session is established between the credential host and the destination site, the method further comprising the steps of transmitting from the credential host to the local computer further session information such that a further communication session is established between the credential host and the local computer and replicating data transmitted in the communication session between the destination site and the credentials host in the further communication session between the credential host and the local computer.

23. A host based security method as set forth in claim 22 wherein the session information includes an address of a location at the destination site wherein the data transmitted between the credential host and the destination site is associated with the address, the method further comprising the step of translating the address at the credential host wherein the replicated data transmitted between the credential host and the destination site is associated with the translated address.

24. A host based security method as set forth in claim 22 further comprising the steps of storing at the credential host the session information for the communication session between the credential host and the destination site, and developing at the credential host new session information for a second communication session between the credential host and the local computer.

25. A host based security method as set forth in claim 24 further comprising the steps of inspecting at the credential host data transmitted in the communication session and implementing predetermined rules in the event predetermined information at the destination site is selected prior to the predetermined information being acted upon at the destination site.

26. A host-based security method as set forth in claim 25 further comprising the steps of entering additional credentials associated with the user of the local computer at an auxiliary device and communicating the additional credentials from the auxiliary device to the credential host, wherein one of the predetermined rules requires the additional credentials upon selection of the predetermined information, the predetermined information being acted upon only in the event the additional credentials are authenticated at the credential host.

27. A host based security method as set forth in claim 22 further comprising the steps of storing at the credential host personal information of the user of the local computer in association with an alphanumeric character string, entering the character string at the local computer and transmitting the character string to the credential host, and transmitting the personal information associated with the character string to the destination site in response to receipt of the character string.

28. A host based security method as set forth in claim 20 wherein DNS settings of the local computer are pointed to DNS settings of the credential host such that the credential host resolves domains of the destination site and corresponding IP addresses of the destination site and routes the communication session with the domains through the credential host.

29. A host based security method as set forth in claim 20 wherein the credentials transmitting step transmits the credentials to the destination site and the session information transmitting step transmits the session information to the credential host such that the communication session is established between the credential host and the destination site, the method further comprising extending access by the credential host to the communication session to the local computer such that the local computer interacts with the data communicated during the communication session.

30. A host based security method as set forth in claim 29 wherein the local computer and the credential host each included executable components of a distributed network browser wherein components at the local computer manage display and input and components at the credential host manage authentication.

31. A host based security method as set forth in claim 30 wherein interfaces of the components are communicated between the local computer and the credential host through an application level tunnel.

32. A host based security method as set forth in claim 29 wherein the credential host includes a browser in which data transmitted in the communication session is rendered, the rendered data being further mirrored at the local computer.

33. A host based security method as set forth in claim 20 wherein the credential transmitting step transmits from the credential host to the destination site additional information associated with the credentials, the additional information being associated with a user of the local computer such that the credentials are validated as being associated with the user.

34. A host based security method as set forth in claim 33 wherein an auxiliary device associated with the user is in communication with the credential host, the additional information being developed at the credential host in response to the auxiliary device being authenticated by the credential host.

35. A host based security method as set forth in claim 33 wherein the additional information is encrypted using the key known only to the credential host and the destination site.

36. A host based security method as set forth in claim 20 wherein the credentials include a User ID and an initial password associated with the local computer and originally registered with the destination site, the method further comprising the step of registering by the credential host upon the credentials being stored at thereat a subsequent password at the destination site to replace the initial password.

37. A host based security method as set forth in claim 36 wherein the credential host further stores private user information associated with the credentials, the private user information being available to the destination site during the communication session.

38. A host based security method as set forth in claim 20 wherein the credentials associated with the user includes a user ID and a password, the user ID being entered at the local computer and transmitted to the credential host, the password being entered at the auxiliary device and transmitted to the credential host.

* * * * *